United States Patent
Mammoser et al.

(10) Patent No.: US 6,816,747 B2
(45) Date of Patent: Nov. 9, 2004

(54) COMPUTER-IMPLEMENTED SYSTEM AND PROCESS FOR IMPROVING MANUFACTURING PRODUCTIVITY

(75) Inventors: Mark Steven Mammoser, Novi, MI (US); Michael John Popenas, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/248,706

(22) Filed: Feb. 11, 2003

(65) Prior Publication Data

US 2004/0158338 A1 Aug. 12, 2004

(51) Int. Cl.[7] .......................... G06F 19/00; G01N 37/00
(52) U.S. Cl. ........................................ 700/109; 702/84
(58) Field of Search ............................ 700/51, 99, 100, 700/108, 109; 702/81, 84

(56) References Cited

U.S. PATENT DOCUMENTS

| | | | |
|---|---|---|---|
| 5,311,759 A | | 5/1994 | Mangrulkar et al. |
| 5,440,478 A | | 8/1995 | Fisher et al. |
| 5,452,218 A | * | 9/1995 | Tucker et al. ............... 700/110 |
| 5,586,041 A | | 12/1996 | Mangrulkar |
| 5,715,181 A | * | 2/1998 | Horst .......................... 702/180 |
| 5,731,572 A | * | 3/1998 | Winn ........................ 235/70 R |
| 5,946,661 A | | 8/1999 | Rothschild et al. |
| 5,956,251 A | * | 9/1999 | Atkinson et al. ........... 700/109 |
| 6,253,115 B1 | * | 6/2001 | Martin et al. ................. 700/97 |
| 6,353,767 B1 | | 3/2002 | Wakeman et al. |
| 6,675,135 B1 | * | 1/2004 | Murray et al. ................. 703/2 |
| 6,725,183 B1 | * | 4/2004 | Cawse ............................ 703/2 |
| 2002/0007348 A1 | | 1/2002 | Ali et al. |
| 2002/0026257 A1 | * | 2/2002 | Newmark ................... 700/108 |
| 2002/0059093 A1 | | 5/2002 | Barton et al. |
| 2002/0082736 A1 | * | 6/2002 | Lech et al. ................. 700/108 |

FOREIGN PATENT DOCUMENTS

CN       1297146 A     5/2001

OTHER PUBLICATIONS

Ford Motor Company, Spotlight on Ford, website, www.engineering–education.org.uk/s–ford.htm.
Ford Motor Company of Canada Limited, Windsor Engine Plant, Jul. 29, 2002, website, www.shingoprize.org/recipients/2000/ford.html.
Cap Gemini Ernst & Young, Lean Manufacturing & Operations, Creating Customer Satisfaction at the Right Time for the Lowest Cost.

* cited by examiner

Primary Examiner—Ryan A. Jarrett
(74) Attorney, Agent, or Firm—David B. Kelley (57) ABSTRACT

One aspect of the present invention relates, to a computer-implemented system for improving manufacturing productivity. The system is comprised of at least one computer configured to: (1) receive a plurality of productivity data elements regarding a manufacturing process, a plurality of six sigma elements, and a plurality of lean manufacturing elements, and (2) aid in determining at least one productivity improvement to the manufacturing process by utilizing the plurality of six sigma elements and the plurality of lean manufacturing elements with the plurality of productivity data elements. The at least one productivity improvement is relied upon to reduce operating costs.

16 Claims, 9 Drawing Sheets

| No. | Quality | Cost | Productivity | Statement | Transport | Manual | Priority | Type |
|---|---|---|---|---|---|---|---|---|
| 1 | ✓ | | ✓ | Sta. 106 - Chain Cover; Operator marking part as verified for set screw based on mark made from upstream operation; not visually checking for screw. Chamfer issue. | | ✓ | ✓ | Over Production |
| 2 | | | ✓ | Sta. 72 running at 25sec/cycle blocked by Sta. 73. | | | | Wait |
| 3 | | | ✓ | Sta. 73 manual operation backing up Sta. 72. | | ✓ | | Wait |
| 4 | | | ✓ | Sta. 80 not running at cycle; low content (3 roll-pins added); operator stops while hi-low delivers new material to station; backs up upstream operations at Sta. 73 and 72. | | ✓ | | Wait |
| 5 | | | ✓ | Sta. 105 had 3 people working in the work space (TEMPORARY SITUATION); appeared too small for 3 people to be efficient; chain cover was not being loaded at cycle. | | ✓ | | Wait |
| 6 | | | ✓ | No tact time indicators observed at manual stations. Install stack lights for operators to have a visual aid in keeping to the tact time. STP has done this. | | ✓ | ✓ | Wait |
| 7 | ✓ | | ✓ | Sta. 345, 347, 348 in Button Up - Leak Test; observed 38 sec. cycle times (too long). Many negative leak rates observed (Potentially due to no master part or daily calibration conducted). Leak rate variation found from machine to machine. Stations do no | | | | Correction |

*Fig. 10*

COMPUTER-IMPLEMENTED SYSTEM AND PROCESS FOR IMPROVING MANUFACTURING PRODUCTIVITY

BACKGROUND OF INVENTION

1. Field of the Invention

One aspect of the present invention generally relates to a computer-implemented system and method for improving manufacturing productivity of a manufacturing process and, more specifically, a system and method for improving manufacturing productivity by using a combination of six sigma and lean manufacturing.

2. Background Art

In today's manufacturing business environment, companies are focused on finding tools to effectively decrease costs and increase productivity in manufacturing.

Six Sigma is one such tool that offers a group of statistical analysis techniques for reducing process output variations so that plus or minus six sigmas (i.e., standard deviations) lie between the mean and nearest specified output limit. Six sigma uses the DMAIC approach for reducing process output variation. DMAIC is the abbreviation for "Define, Measure, Analyze, Improve, and Control". Applied to the manufacturing setting, six sigma can be utilized to search for variations in manufacturing processes and detect the cause of such variations. Although six sigma is effective at identifying differences in manufacturing processes over time, it does not offer an entire solution for driving increased productivity for manufacturing companies.

Lean manufacturing is another tool used to drive manufacturing process improvements. Lean manufacturing is focused on eliminating waste in a manufacturing process. In general terms, lean manufacturing offers tools for studying a process for waste and implementing controls to reduce the waste. Although lean manufacturing is effective in identifying and reducing waste on a quantitative level, it does not offer analytical and quantitative tools for eliminating waste.

A method and system is desired that integrates aspects of six sigma and lean manufacturing to provide a unique analytical tool for improving manufacturing processes. This method and system should be able to quantitatively and qualitatively analyze manufacturing data to drive productivity improvements in the manufacturing environment. Additionally, this method and system should have the ability to be computer-implemented

SUMMARY OF INVENTION

One aspect of the present invention is a computer-implemented method and system for improving manufacturing productivity by integrating aspects of six sigma and lean manufacturing to provide a unique analytical tool. Another aspect of the present invention is to provide the ability to quantitatively and qualitatively analyze manufacturing data to drive productivity improvements in the manufacturing environment.

One preferred computer-implemented system embodiment of the present invention for improving manufacturing productivity includes an at least one computer configured to aid in the determination of an at least one productivity improvement to a manufacturing process by using a combination of a plurality of six sigma elements and a plurality of lean manufacturing elements with a plurality of data elements regarding the manufacturing process. The at least one productivity improvement is relied upon to reduce operating costs.

Another preferred computer-implemented system embodiment of the present invention for improving manufacturing productivity includes an at least one computer that is configured to receive a plurality of productivity data elements regarding a manufacturing process, a plurality of six sigma elements, and a plurality of lean manufacturing elements and aid in the determination of an at least one productivity improvement to the manufacturing process by utilizing the plurality of six sigma elements and the plurality of lean manufacturing elements based on the plurality of productivity data elements.

In a preferred system embodiment, the at least one productivity improvement is used to at least reduce operating costs. The at least one computer can be additionally configured to define a problem with the manufacturing process. The problem is used in determining the at least one productivity improvement. The at least one computer can be additionally configured to measure the manufacturing process to obtain process measurements. The process measurements can be used in determining the at least one productivity improvement. The at least one computer can be additionally configured to analyze the manufacturing process to obtain process analysis information. The process analysis information can be used in determining the at least one productivity improvement. The at least one computer can be additionally configured to implement the at least one productivity improvement. The at least one computer can be additionally configured to control the at least one productivity improvement. The at least one productivity improvement can be comprised of a new manufacturing process or a constraint removed from the manufacturing process.

One preferred computer-implemented method embodiment of the present invention for improving manufacturing productivity includes receiving a plurality of productivity data elements regarding a manufacturing process, a plurality of six sigma elements, and a plurality of lean manufacturing elements, and aiding in the determination of an at least one productivity improvement to the manufacturing process by utilizing the plurality of six sigma elements and the plurality of lean manufacturing elements based on the plurality of productivity data elements. The at least one productivity improvement is relied upon to reduce operating costs.

In a preferred method embodiment, the method embodiment further comprises defining a problem with the manufacturing process. The problem is used in determining the at least one productivity improvement. The preferred method embodiment can further comprise measuring the manufacturing process to obtain process measurements. Process measurements can be used in determining the at least one productivity improvement. The preferred method embodiment can further comprise analyzing the manufacturing process to obtain process analysis information. The process analysis information can be used in determining the at least one productivity improvement. A preferred method embodiment can further comprise implementing the at least one productivity improvement. A preferred method embodiment can further comprise controlling the at least one productivity improvement. The at least one productivity improvement can be a new manufacturing process or a constraint removed from the manufacturing process.

The above and other objects, features, and advantages of the present invention are readily apparent from the following detailed description of the best mode for carrying out the invention when taken in connection with the accompanying drawings.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

DETAILED DESCRIPTION

As required, detailed embodiments of the present invention are disclosed herein. However, it is to be understood that the disclosed embodiments are merely exemplary of the invention that may be embodied in various and alternative forms. Therefore, specific functional details herein are not to be interpreted as limiting, but merely as a representative basis for the claims and/or as a representative basis for teaching one of ordinary skill in the art to variously employ the present invention.

One aspect of the present invention relates to a computer-implemented system for improving manufacturing productivity. The system is comprised of at least one computer configured to: (1) receive a plurality of productivity data elements regarding a manufacturing process, a plurality of six sigma elements, and a plurality of lean manufacturing elements, and (2) aid in determining an at least one productivity improvement to the manufacturing process by utilizing the plurality of six sigma elements and the plurality of lean manufacturing elements based on the plurality of productivity data elements.

Figure 1:
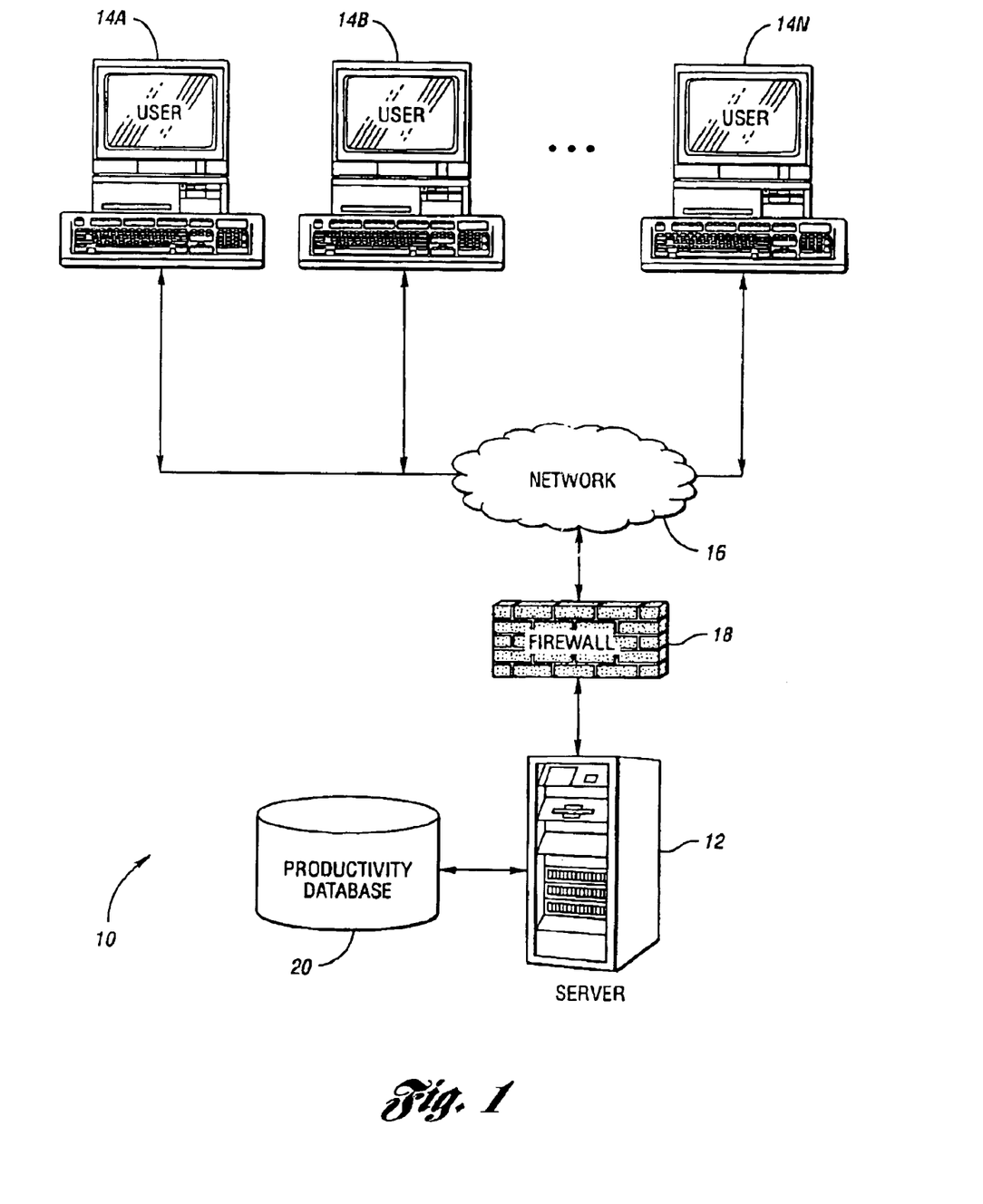
FIG. 1 is a schematic diagram illustrating a preferred system for implementing the present invention.

FIG. 1 is a schematic diagram illustrating a preferred system 10 for implementing the present invention. FIG. 1 illustrates an at least one server computer 12 operably serving a plurality of client computers 14A–14N through network 16 and optionally firewall 18. The at least one server computer 12 is operably configured to store information to, and retrieve information from, at least one productivity database 20. It is fully contemplated that computer network 16 can be comprised of any one or more of a variety of computer communication configurations including but not limited to local area network (LAN), a wide area network (WAN), a wireless network, an intranet, an extranet and the Internet.

It is fully contemplated that client computers 14A–N can be used to practice the invention with or without information stored in productivity database 20. For example, the functional modules and information can be stored locally on a client computer. It is also understood that some steps in the methods of the present invention may be performed manually without the use of the preferred system or other comparable system.

Another aspect of the present invention relates to a computer-implemented method for improving manufacturing productivity. The method is generally comprised of: (1) receiving a plurality of productivity data elements regarding a manufacturing process, a plurality of six sigma elements, and a plurality of lean manufacturing elements; and (2) aiding in the determination of at least one productivity improvement to the manufacturing process by utilizing the plurality of six sigma elements and the plurality of lean manufacturing elements based on the plurality of productivity data elements.

Figure 2:
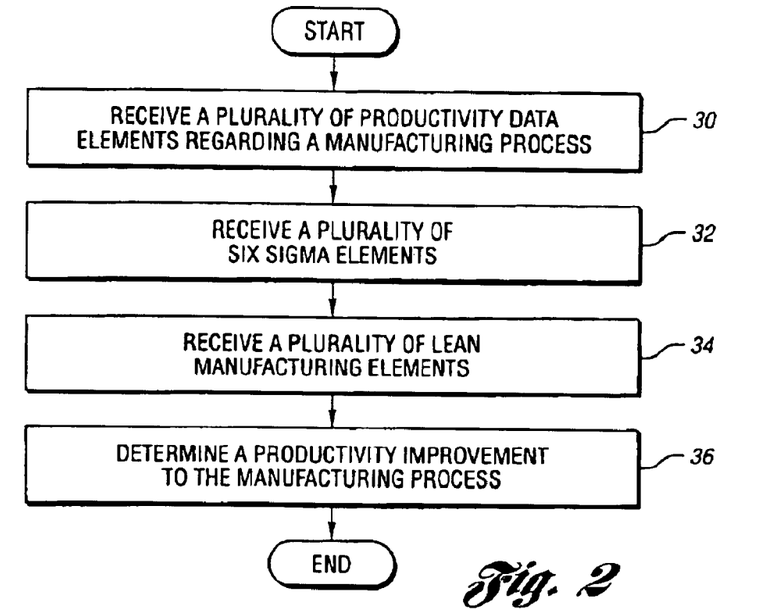
FIG. 2 is a block flow diagram illustrating a preferred methodology for implementing the present invention.

FIG. 2 is a block flow diagram illustrating a preferred methodology for implementing the present invention.

As depicted in block 30 of FIG. 2, a plurality of productivity data elements are received regarding a manufacturing process. Examples of productivity data elements include, but are not limited to, (1) value stream data blocks, (2) organizational charts, (3) financial performance, (4) performance to schedule, (5) gap (i.e., shortfall) analysis, (6) value stream map(s), (7) plant layouts, (8) control plans, (9) process flow charts, (10) process sheets, (11) standardized work sheets, (12) line stop metrics, (13) maintenance records, (14) problem history, (15) failure modes with effects analysis (i.e., identifying sources of waste), (16) waste walk data form, (17) MTTR (i.e., mean time to repair) and MTBF (i.e., mean time between failure), (18) cycle time, (19) down/up time, (20) information systems status, (21) gage R&R (i.e., repeatability and reproducability), and (22) operator feedback/response. It should be understood that the plurality of productivity data elements can vary depending on the manufacturing process to best fit a particular implementation of the present invention.

As depicted in block 32, a plurality of six sigma elements are received. Examples of six sigma elements include, but are not limited to, (I) determination of critical to quality, critical to customer, and cost of poor quality, (II) definition of scope and timing of project, (III) identification of key stakeholders and project champions, (IV) process mapping, (V) drill down utilizing Y=f(x), (VI) Ishikawa diagrams and cause/effect matrix, (VII) development of data collection plan, (VIII) performance of measure system analysis, (IX) data collection, (X) performance of graphical analysis, multi-variable charting day-by-shift and hour-by-our, (XI) operation by operation performance analysis (using Pareto, analysis of variance, DPMO (i.e., defects per million opportunities), RTY (i.e., roll throughput yield), and/or control charting), (XII) correlation analysis, (XIII) conducting DOE (i.e., design of experiment), determining main effects and interactions, (XIV) mistake proofing, (XV) process monitoring, (XVI) pilot/validate improvement, (XVII) capability studies, (XVIII) process simulation, (XIX) process simulation of process development, and (XX) statistical control. It should be understood that the plurality of six sigma elements can vary depending on the manufacturing process to best fit a particular implementation of the present invention.

As depicted in block 34, a plurality of lean manufacturing elements are received. Examples of lean manufacturing elements include, but are not limited to, (A) value stream maps, (B) definition of responsibilities and coach roles, (C) dock-to-dock metric, (D) OEE (i.e., overall equipment efficiency) metric or equipment efficiency, (E) waste walk, (F) constraint analysis, (G) JPH potential analysis, (H) waste walk, (I) continuous improvement work teams, (J) define work group activities, (K) current state maps, (L) future state maps, (M) standardized work sheets, (N) mistake proofing, (O) visual factory, (P) total productive maintenance, and (Q) work group training. It should be understood that the plurality of lean manufacturing elements can vary depending on the manufacturing process to best fit a particular implementation of the present invention.

As depicted in block 36, a productivity improvement to the manufacturing process is determined. This determination is made by utilizing the plurality of productivity data elements, the plurality of six sigma elements, and the plurality of lean manufacturing elements.

Figure 3:
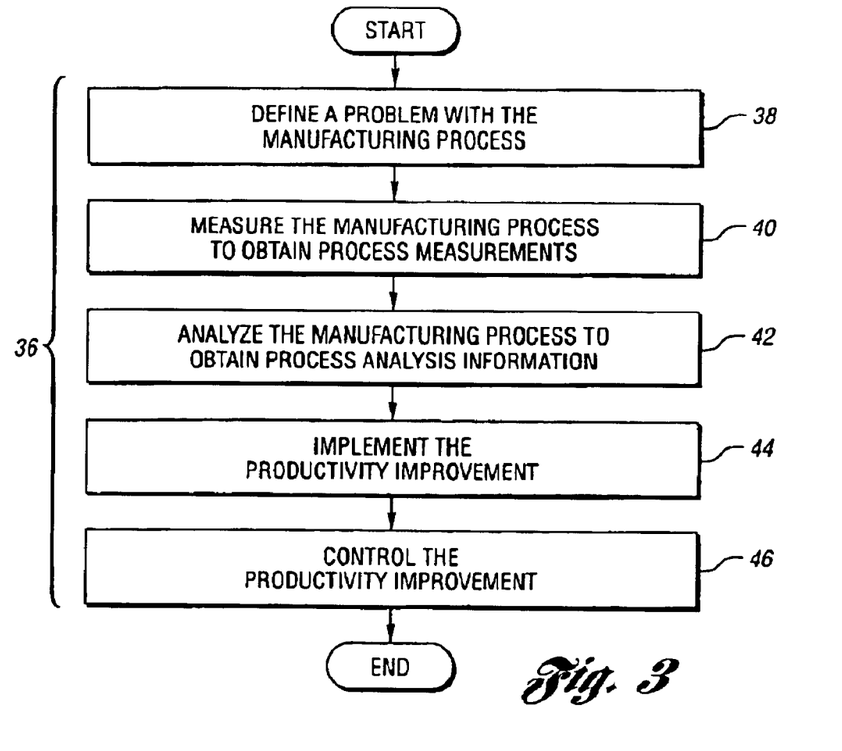
FIG. 3 is a block flow diagram illustrating a preferred methodology for implementing the present invention.

In accordance with a preferred embodiment of the present invention, block 36 is carried out by a five step process as depicted in FIG. 3.

Figure 4:
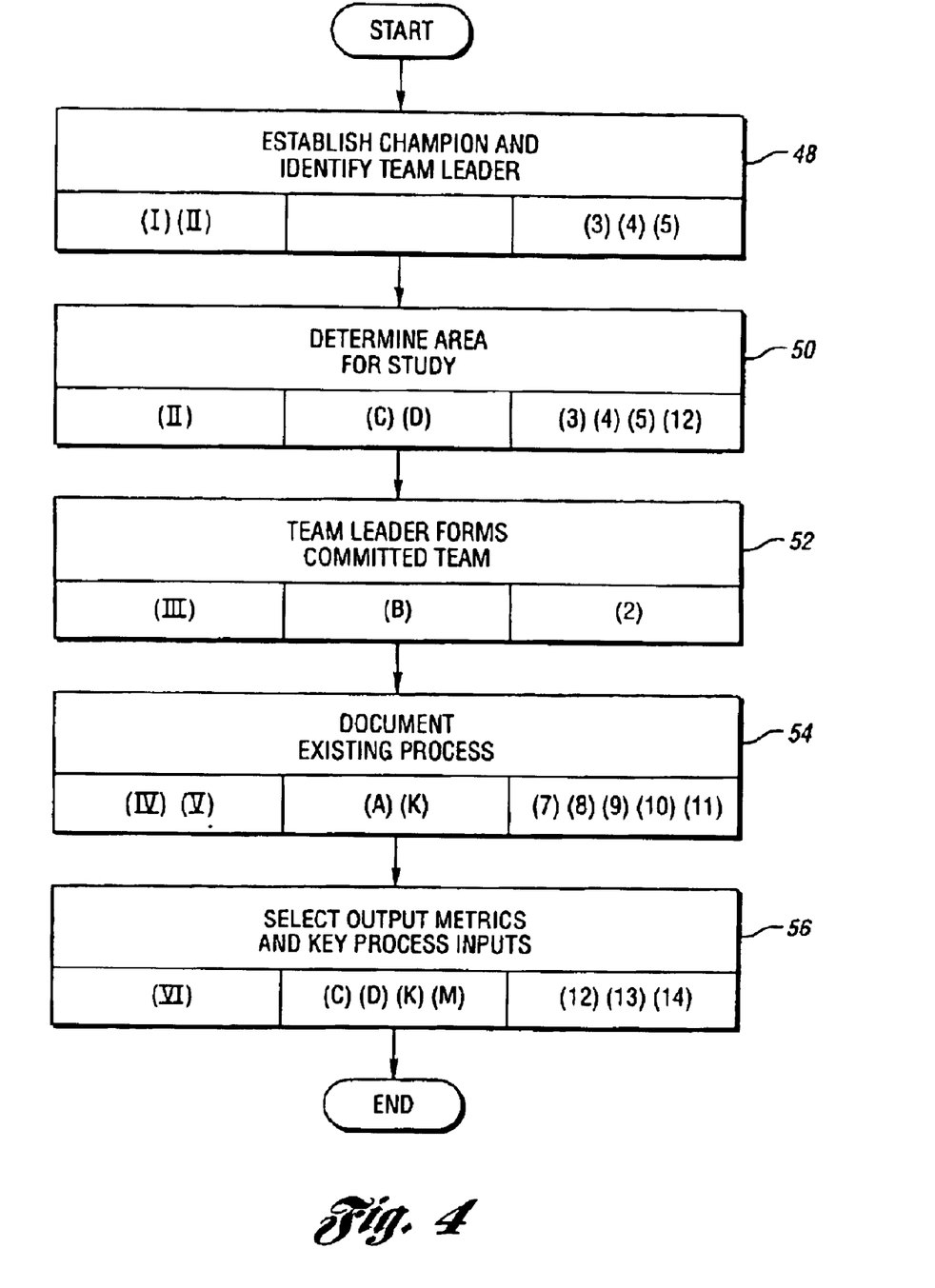
FIG. 4 is a block flow diagram illustrating a preferred methodology for implementing the present invention.

As depicted in block 38 of FIG. 3, a problem with the manufacturing process is defined. Preferably, the following process is used to identify the problem, as depicted in FIG. 4. First, a champion is established and a team leader is identified by using six sigma elements (I) and (II) with productivity data elements (3), (4), and (5), as depicted in block 48. Second, an area of study is determined by using six sigma elements (II) and lean manufacturing elements (A), (B), and (D) with productivity data elements (3), (4), (5), and (12), as depicted in block 50. Third, the team leader establishes a committed team by using (III) and (B) with (2), as depicted in block 52. Fourth, the existing manufacturing process is documented by using (IV), (V), (A), and (K) with (7), (8), (9), (10), and (11), as depicted in block 54. Fifth, output metrics and key process input variables are selected by using (VI), (C), (D), (K), and (M) with (12), (13), and (14), as depicted in block 56.

Figure 5:
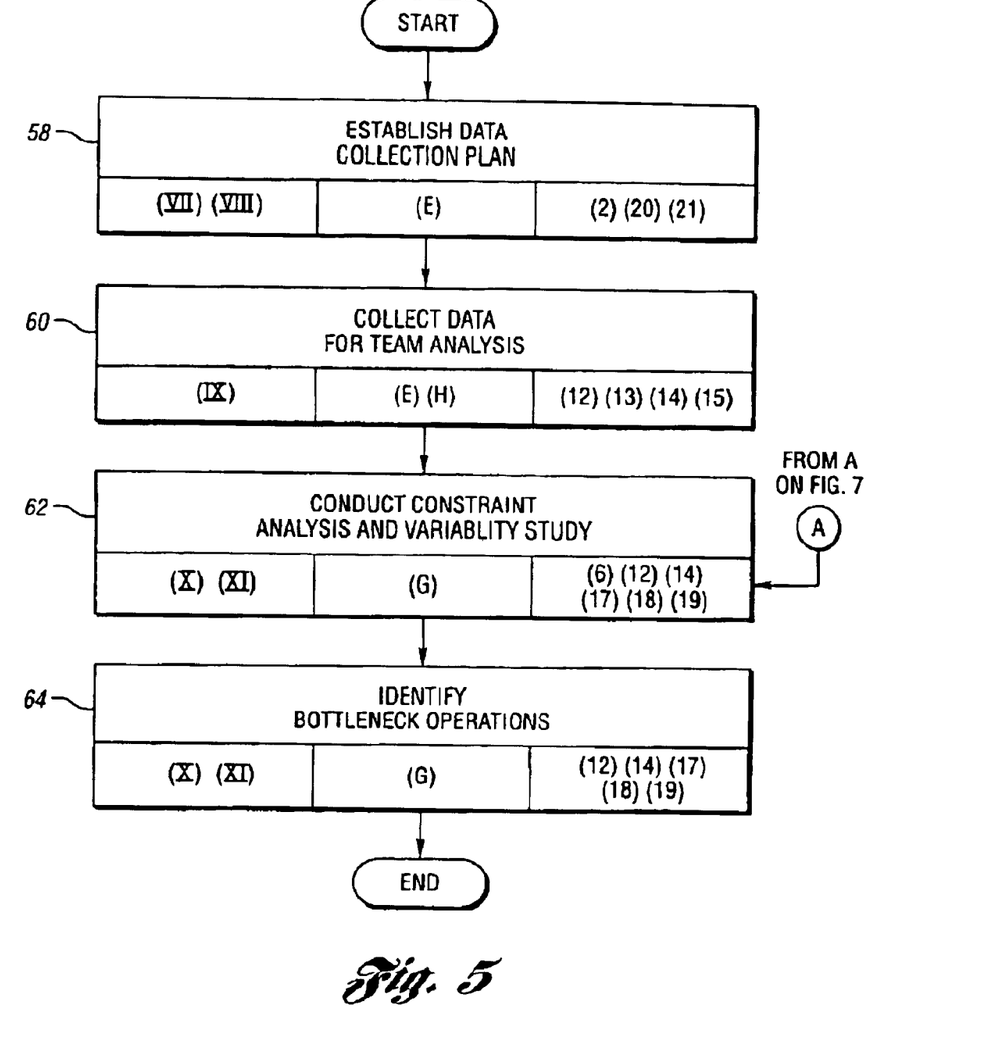
FIG. 5 is a block flow diagram illustrating a preferred methodology for implementing the present invention.

As depicted in block 40, the manufacturing process is measured to obtain process measurements. Preferably, the following process is used to measure the manufacturing process, as depicted in FIG. 5. First, a data collection plan is established by using (VII), (VIII), (E) with (2), (20), and (21), as depicted in block 58. Second, data is collected for team analysis by using (IX), (E), and (H) with (12), (13), (14), and (15), as depicted in block 60. Third, a constraint analysis and variability study is conducted by using (IX), (E), and (H) with (6), (12), (14), (17), (18), and (19), as depicted in block 62. Optionally, step three can be conducted with constrained manufacturing processes, as depicted by line A and described in more detail below. Fourth, bottleneck operations are identified using (X), (XI), and (G) with (12), (14), (17), (18), and (19), as depicted in block 64.

Figure 6:
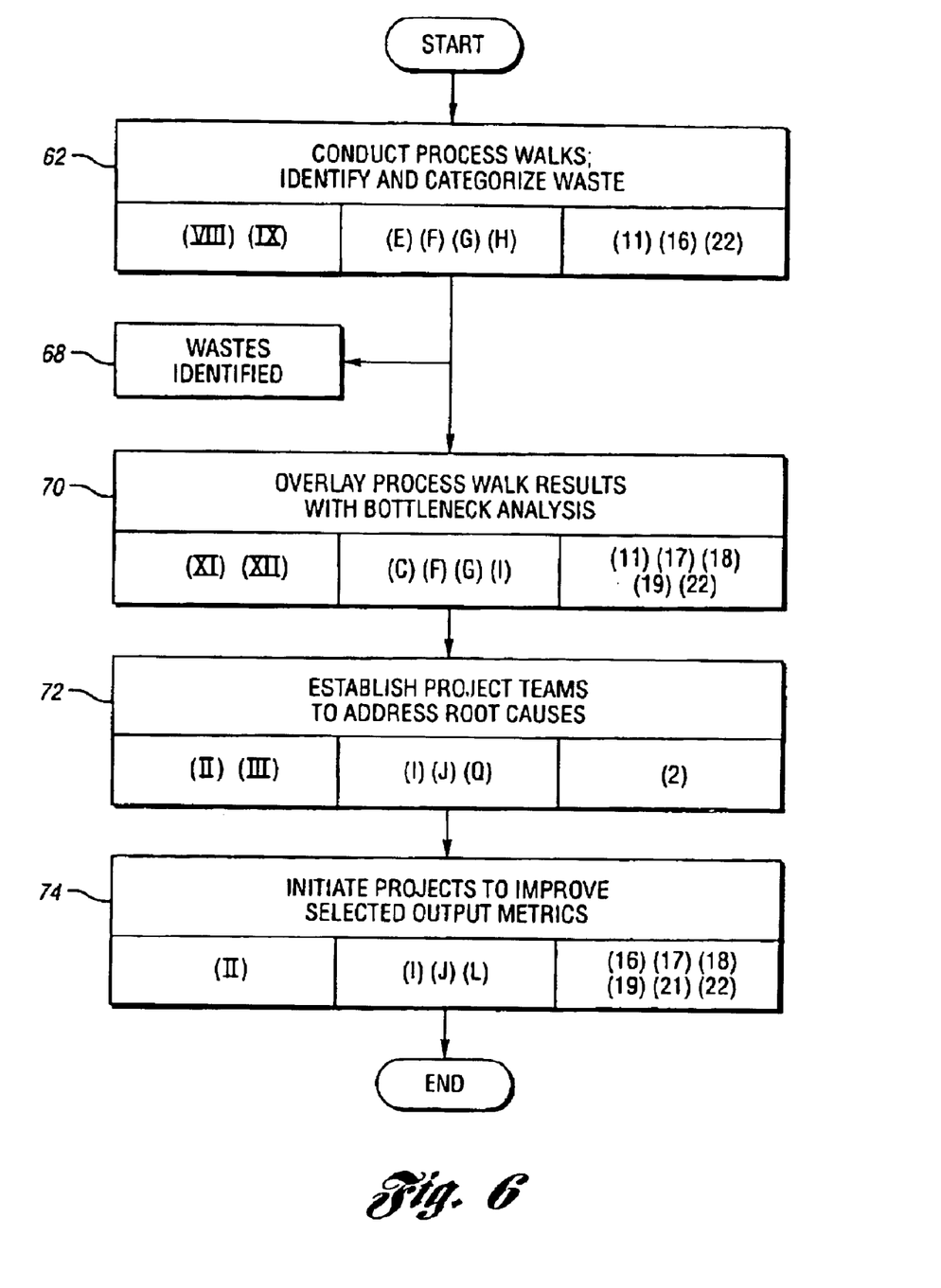
FIG. 6 is a block flow diagram illustrating a preferred methodology for implementing the present invention.

As depicted in block 42, the manufacturing process is analyzed to obtain process analysis information. Preferably, the following process is used to analyze the manufacturing process, as depicted in FIG. 6. First, process walks are conducted and wastes are identified and categorized by using (VIII), (IX), (E), (F), (G), and (H) with (11), (16), and 22, as depicted in block 66. Optionally, wastes are identified after step one, as depicted in block 68. Second, process walk results are overlaid with bottleneck analyses by using (XI), (XII), (C), (F), (G), and (I) with (11), (17), (18), (19), and (22), as depicted in block 70. Third, project team(s) to address root causes are established by using (II), (III), (I), (J), and (K) with (2), as depicted in block 72. Fourth, projects are initiated to improve selected output metrics by using (II), (I), (J), and (L) with (16), (17), (18), (19), (21), and (22).

Figure 7:
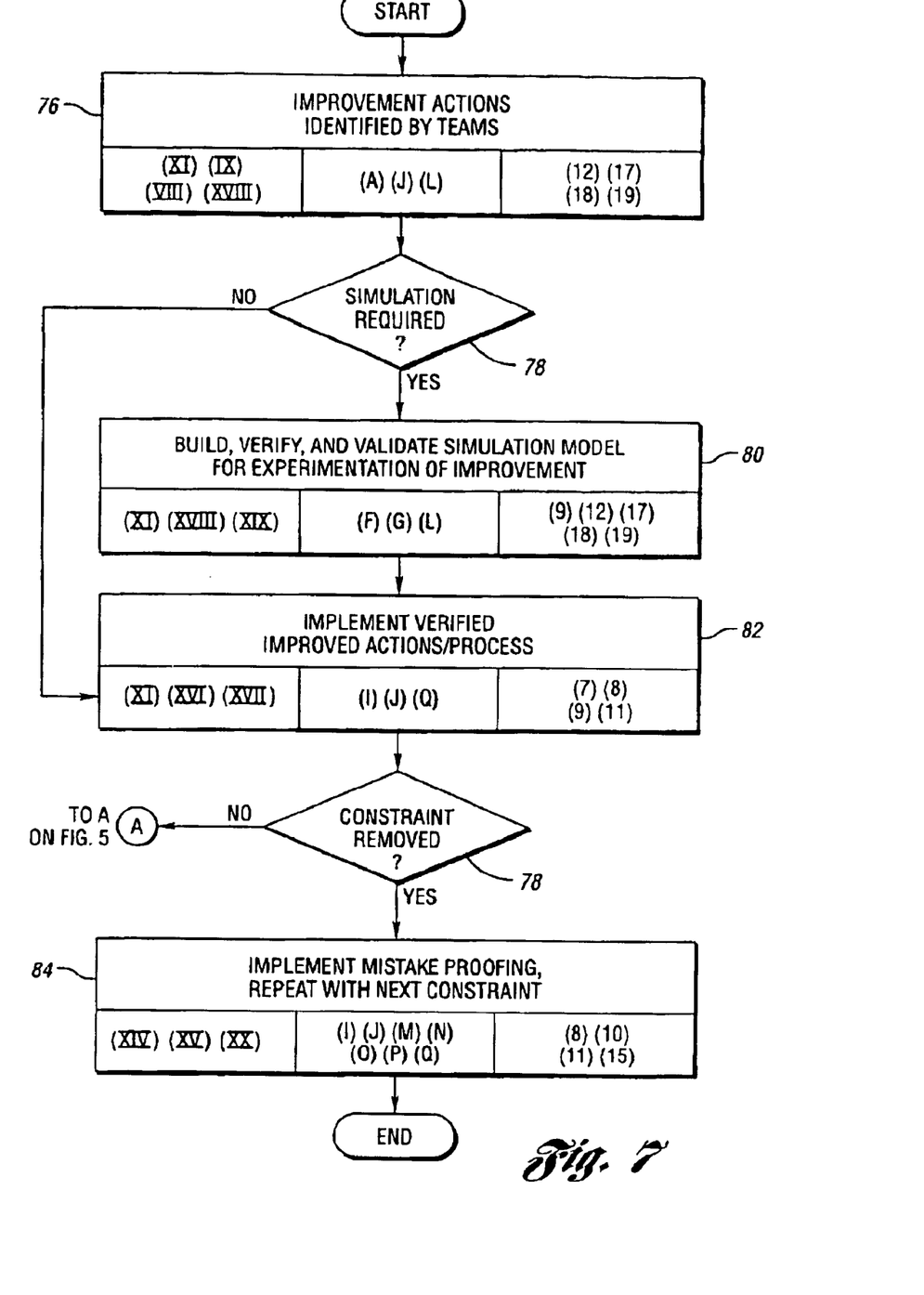
FIG. 7 is a block flow diagram illustrating a preferred methodology for implementing the present invention.

As depicted in blocks 44 and 46, the productivity improvement is implemented and controlled. Preferably, the following process is used to implement and control the productivity improvement, as depicted in FIG. 7. As depicted in block 76, improvement actions are identified by teams by using (IV), (XI), (XIII), (XVIII), (A), (J), (L) with (12), (17), (18), and (19). As depicted in decision block 78, simulation may be required at this point in the process. For example, a manufacturing process or system with a high degree of interaction may be a candidate for simulation. If simulation is required, a simulation model is built, verified, and validated for experimentation of improvement by using (XI), (XVIII), (XIX), (F), (G), and (L) with (9), (12), (17), (18), and (19), as depicted in block 80. As depicted in block 82, the verified improved actions or process is implemented by using (IV), (XVI), (XVII), (I), (J), and (Q) with (7), (8), (9), and (11). As depicted by block 84 and line A, if a constraint has not been removed from the manufacturing process by virtue of the above steps, then the process is redirected to the step embodied in block 62. If a constraint has been removed, mistake proofing is implemented and the entire process is repeated with the next constraint by using (XIV), (XV), (XX), (I), (J), (M), (N), (O), (P), and (Q) with (8), (10), (11), and (15), as depicted in block 86.

Elements and steps of the preferred methodology disclosed above can be modified as long as the modification results in a methodology that drives productivity improvements by the combination of six sigma and lean manufacturing. It is fully contemplated that certain steps disclosed above can be rearranged or deleted to best fit a particular implementation of the present invention. Moreover, the productivity data elements, six sigma elements, and lean manufacturing elements can be added or removed from the steps as disclosed above in certain situations to best fit a particular implementation of the present invention.

For example, the following list of elements are preferably used in another preferred methodology of the present invention:

process mapping and value stream mapping

JPH potential analysis for bottleneck identification

Pareto analysis of bottleneck faults multi-vary charts of line stop metrics versus JPH analysis of variance (ANOVA) on line stop metrics waste walk and primary data collection of waste control charting of JPH and other line stop metrics defects per million calculation and comparison Fishbone (Ishikawa) diagrams The methods and systems of the present invention can be implemented to improve manufacturing productivity of manufacturing processes. For example, the following provides an example of the present invention driving improvements in a final assembly process using the present invention.

At a hypothetical plant A, uptime efficiency for final assembly lines for transmission products P1, P2, P3 and P4 in 2000 is 78%, 68%, 55%, and 76%, respectively. In 2001, the target uptime efficiencies for final assembly lines for transmission products P1, P2, P3, and P4 is 85%, 85%, 85%, and 85%, respectively. The combination of six sigma and lean manufacturing provides an advantageous system and method for identifying waste (i.e., hidden factories), quickly and accurately, and controlling the waste at minimum levels.

Additionally, overtime costs for hypothetical plant A is $12.4 million and the target is $8.0 million.

Figure 8:
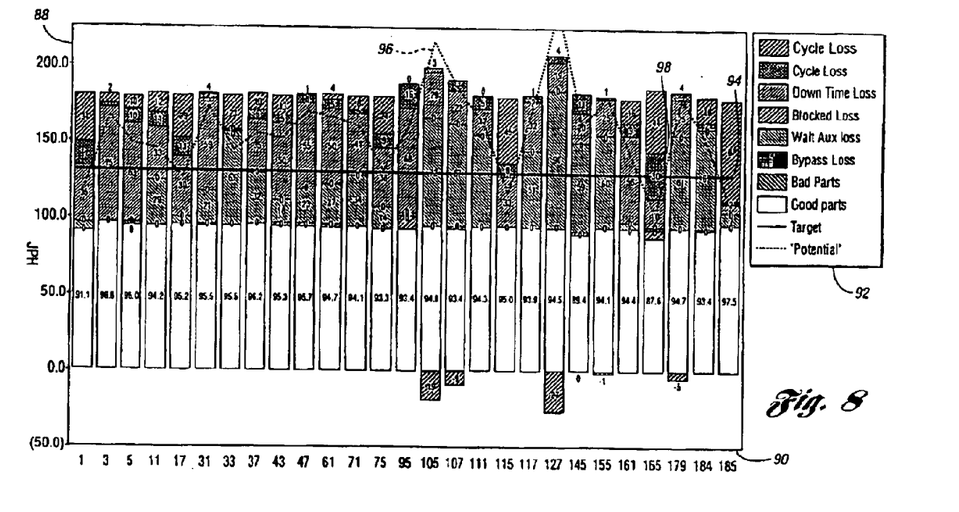
FIG. 8 illustrates a process measurement graph for a transmission product in accordance with a preferred embodiment of the present invention utilizing the JPH potential analysis lean manufacturing element (G)

FIG. 8 illustrates a process measurement graph for the P3 transmission product in accordance with a preferred embodiment of the present invention utilizing the JPH (jobs per hour) potential analysis lean manufacturing element (G). According to FIG. 8, the JPH potential analysis is being utilized to identify bottleneck operations. The graph depicts JPH on the y-axis 88 as a function of stations on a manufacturing/assembly line on the x-axis 90. Legend 92 describes different conditions of stations on the manufacturing line. The target for JPH is represented by line 94. The potential JPH is represented by line 96. Of particular note, when potential line 96 is line 96. Of particular note, when potential line 96 is below base line 94, a bottleneck exists, for example, at region 98 on the graph. This type of analysis is effective in identifying the problem with the manufacturing/assembly line.

Figure 9:
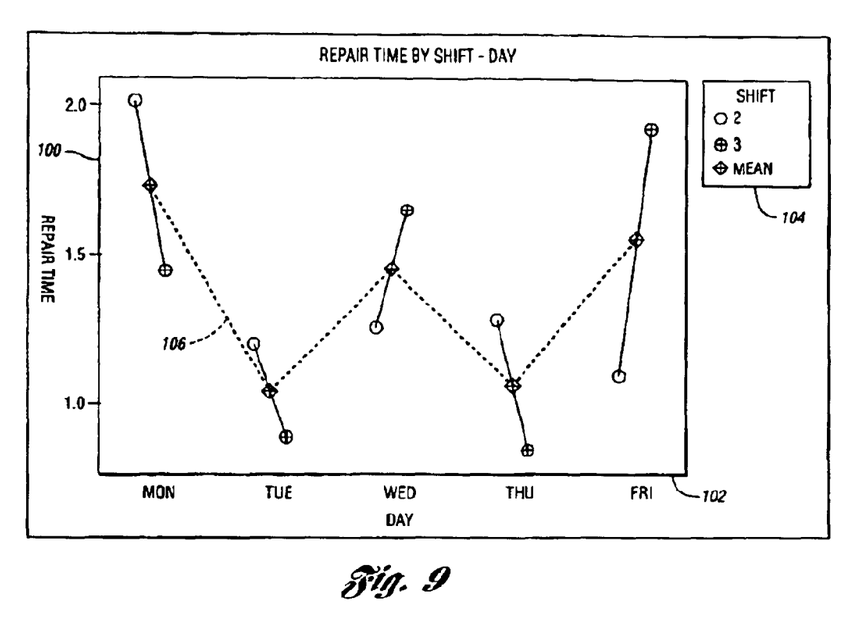
FIG. 9 illustrates a graph for repair time by shift and day in accordance with a preferred embodiment of the present invention utilizing the multi-vary analysis six sigma element (X)

To find a solution to the problem, six sigma elements are preferably used in combination with the potential JPH analysis in accordance with a preferred embodiment of the present invention. For example, FIG. 9 illustrates a graph for repair time by shift and day in accordance with a preferred embodiment of the present invention utilizing multi-vary analysis which is six sigma element (X). According to FIG. 9, the multi-vary analysis is being used to identify and quantify bottleneck operations by looking at variations in repair time by shifts for different days of the week. The graph depicts repair time on the y-axis 100 as a function of day of the week on the x-axis 102 for two shifts. Legend 104 identifies the shift 2, shift 3, and mean repair time by icon. Dotted line 106 depicts the variation between the mean repair time through the week. This type of analysis is useful in finding specific problems that lead to a bottleneck. According to this example, the following problems have been identified: (1) excess time for repairs is experienced for repairs on Monday's second shift as compared to other second shifts that week, and (2) the third shift shows a high degree of variability through the week.

Figure 10:
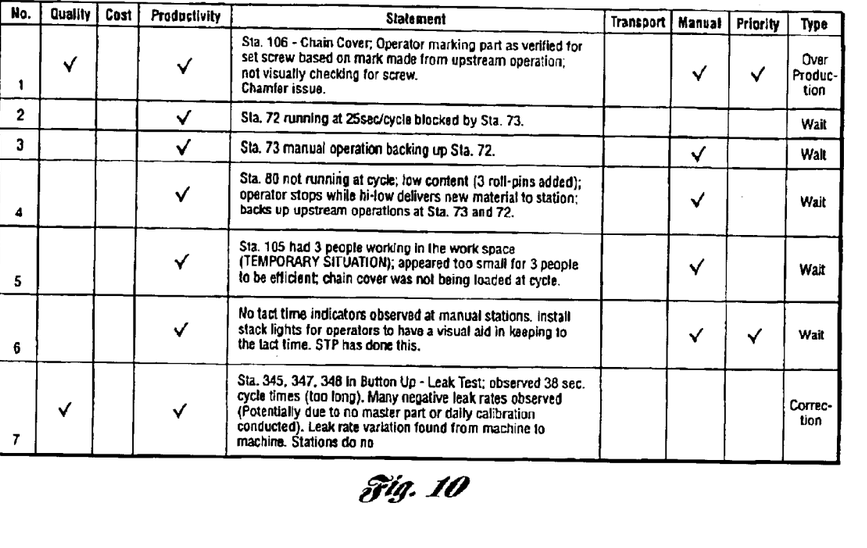
FIG. 10 depicts a process analysis utilizing the waste walk lean manufacturing element (H) in accordance with a preferred embodiment of the present invention.

FIG. 10 depicts a process analysis utilizing the waste walk lean manufacturing element in accordance with a preferred embodiment of the present invention. Preferably, this analysis is used to identify and categorize wastes once bottleneck operations have been identified. The table in FIG. 10 includes but is not limited to the following information: quality, cost, productivity, statement, transport, manual, priority, and type. It is understood that this information can be rearranged, removed, and supplemented to best fit a particular implementation of the present invention.

While the best mode for carrying out the invention has been described in detail, those familiar with the art to which this invention relates will recognize various alternative designs and embodiments for practicing the invention as defined by the following claims.

What is claimed is:

1. A computer-implemented system for improving manufacturing productivity comprising at least one computer wherein the at least one computer is configured to:

receive a plurality of productivity data elements regarding a manufacturing process, a plurality of six sigma elements, and a plurality of lean manufacturing elements, the plurality of six sigma elements including data collection, graphical analysis, and operation by operation performance analysis, and the lean manufacturing elements including waste walk and JPH potential analysis;

perform the six sigma element of data collection in coordination with the lean manufacturing element of waste walk to obtain collected data based on at least two of the following productivity data elements: one or more line stop metrics, maintenance records, problem history, and one or more failure modes;

perform the six sigma elements of graphical analysis an coordination with the lean manufacturing element of JPH potential analysis based on at least two of the following: the collected data, one or more value stream map, one or more line stop metric, problem history, MTTR, MTBF, cycle time, and down/up time through performance of graphical analysis and operation by operation performance analysis and JPH potential analysis to identify one or more bottlenecks in the manufacturing process, wherein the one or more bottlenecks is utilized to identify at least one productivity improvement that is relied upon to reduce operating costs.

2. The computer-implemented system of claim 1 wherein the at least one computer is additionally configured to define a problem with the manufacturing process, wherein the problem is used in determining the at least one productivity improvement.

3. The computer-implemented system of claim 2 wherein the at least one computer is additionally configured to measure the manufacturing process to obtain process measurements, wherein the process measurements are used in determining the at least one productivity improvement.

4. The computer-implemented system of claim 3 wherein the at least one computer is additionally configured to implement the at least one productivity improvement.

5. The computer-implemented system of claim 4 wherein the at least one computer is additionally configured to control the at least one productivity improvement.

6. The computer-implemented system of claim 1 wherein the at least one productivity improvement is comprised of a new manufacturing process.

7. The computer-implemented system of claim 1 wherein the ax least one productivity improvement is comprised of a constraint removed from the manufacturing process.

8. A computer-implemented method for improving manufacturing productivity comprising:

receiving a plurality of productivity data elements regarding a manufacturing process, a plurality of six sigma elements, and a plurality of lean manufacturing elements, the plurality of six sigma elements including data collection, graphical analysis, and operation by operation performance analysis, and the lean manufacturing elements including waste walk and JPH potential analysis;

performing the six sigma element of data collection in coordination with the lean manufacturing element of waste walk to obtain collected data based on at least two of the following productivity data elements: one or more line stop metrics, maintenance records, problem history, and one or more failure modes;

performing the six sigma elements of graphical analysis in coordination with the lean manufacturing element of JPH potential analysis based on at least two of the following: the collected data, one or more value stream map, one or more line stop metric, problem history, MTTR, MTBF, cycle time, and down/up time through performance of graphical analysis and operation by operation performance analysis and JPH potential analysis to identify one or more bottlenecks in the manufacturing process;

wherein the one or more bottlenecks is utilized to identify at least one productivity improvement that is relied upon to reduce operating costs.

9. The computer-implemented method of claim 8 further comprising defining a problem with the manufacturing process, wherein the problem is used in determining the at least one productivity improvement.

10. The computer-implemented method of claim 9 further comprising measuring the manufacturing process to obtain process measurements, wherein the process measurements are used in determining the at least one productivity improvement.

11. The computer-implemented method of claim 10 further comprising implementing the at least one productivity improvement.

12. The computer-Implemented method of claim 11 further comprising controlling the at least one productivity improvement.

13. The computer-implemented method of claim 8 wherein the at least one productivity improvement is comprised of a new manufacturing process.

14. The computer-implemented method of claim 8 wherein the at least one productivity improvement is comprised of a constraint removed from the manufacturing process.

15. A computer-implemented method for improving manufacturing productivity comprising:

receiving a plurality of productivity data elements regarding a manufacturing process, a plurality of six sigma elements, and a plurality of lean manufacturing elements, the plurality of six sigma elements including measure system analysis, data collection, operation by operation performance analysis, correlation analysis, and the lean manufacturing elements including waste walk, constraint analysis, JPH potential analysis, and dock-to-dock metric;

performing the six sigma elements of measure system analysis and data collection in coordination with the lean manufacturing elements of waste walk, constraint analysis, and JPH potential analysis based on at least one of the following: standardized work sheets, waste walk data form, or operator feedback/response to identify and categorize one or more sources of waste to obtain collected data; and performing a bottleneck analysis based on the one or more sources waste, the bottleneck analysis including performing the six sigma elements of operation by operation performance analysis in coordination with at lent two of the following lean manufacturing elements: the collected data, dock-to-dock metrics, constraint analysis, JPH potential analysis, and continuous work improvement team, wherein the results of the bottleneck analysis is utilized to identify at least one productivity improvement that is relied upon to reduce operating costs.

16. The computer-implemented method of claim 15 further comprising performing the six sigma element of definition of scope and timing of project in coordination with the lean manufacturing elements of continuous work improvement team, define work group activities, and future stale maps to initiate one or more projects to improve manufacturing productivity of the manufacturing process.

* * * * *